US008201398B2

(12) United States Patent
Boeckenhoff

(10) Patent No.: US 8,201,398 B2
(45) Date of Patent: Jun. 19, 2012

(54) DIESEL ENGINE EXHAUST TREATMENT SYSTEM WITH DRIVE SHAFT ACCOMMODATING HOUSING AND METHOD

(75) Inventor: Elmar Boeckenhoff, Portland, OR (US)

(73) Assignee: Daimler Trucks North America LLC, Portland, OR (US)

( * ) Notice: Subject to any disclaimer, the term of this patent is extended or adjusted under 35 U.S.C. 154(b) by 913 days.

(21) Appl. No.: 12/214,258

(22) Filed: Jun. 16, 2008

(65) Prior Publication Data

US 2009/0293467 A1 Dec. 3, 2009

Related U.S. Application Data

(60) Provisional application No. 61/057,761, filed on May 30, 2008.

(51) Int. Cl.
*F01N 3/10* (2006.01)
(52) U.S. Cl. .......................... 60/301; 60/299
(58) Field of Classification Search .................. 60/295, 60/299, 301
See application file for complete search history.

(56) References Cited

U.S. PATENT DOCUMENTS

| 2,758,845 | A | | 8/1956 | Doyle et al. |
| 2,789,032 | A | | 4/1957 | Bagley et al. |
| 4,821,840 | A | * | 4/1989 | Harwood et al. ............ 181/282 |
| RE33,118 | E | | 11/1989 | Scheitlin et al. |
| 5,594,217 | A | * | 1/1997 | LeQuire ........................ 181/235 |
| 5,848,720 | A | | 12/1998 | Logan |
| 5,974,791 | A | | 11/1999 | Hirota et al. |
| 6,550,240 | B2 | | 4/2003 | Kolmanovsky et al. |
| 6,694,727 | B1 | | 2/2004 | Crawley et al. |
| 6,820,417 | B2 | | 11/2004 | May et al. |
| 6,871,489 | B2 | | 3/2005 | Tumati et al. |
| 6,874,315 | B2 | | 4/2005 | Nakatani et al. |
| 6,877,312 | B2 | | 4/2005 | Nakatani et al. |
| 6,955,162 | B2 | | 10/2005 | Larson et al. |
| 7,032,376 | B1 | | 4/2006 | Webb et al. |
| 7,055,311 | B2 | | 6/2006 | Beutel et al. |

(Continued)

FOREIGN PATENT DOCUMENTS

WO    WO 2004/038192 A1    5/2004

OTHER PUBLICATIONS

Office action dated Mar. 7, 2011, issued in corresponding U.S. Appl. No. 12/214,271, filed Jun. 16, 2008.

(Continued)

*Primary Examiner* — Thomas Denion
*Assistant Examiner* — Patrick Maines
(74) *Attorney, Agent, or Firm* — Klarquist Sparkman, LLP

(57) ABSTRACT

A diesel exhaust treatment system comprises a housing provided with a drive shaft passageway. The driveshaft of a land vehicle passes through the drive shaft passageway when the drive shaft and diesel exhaust treatment apparatus are incorporated into a vehicle. The housing can be coupled to frame rails of the vehicle with at least a portion of the housing being positioned between vertical planes containing the outer surface of the frame rails. In one specific embodiment at least a portion of the housing is positioned between the frame rails. The housing can comprise a plurality of housing sections, such as upper and lower housing sections which each define a portion of the drive shaft passageway. In addition, the upper housing section can be shorter than the lower housing section.

18 Claims, 11 Drawing Sheets

U.S. PATENT DOCUMENTS

| | | |
|---|---|---|
| 7,210,288 B2 | 5/2007 | Bandl-Konrad et al. |
| 7,245,033 B2 | 7/2007 | Wurtele |
| 7,249,455 B2 | 7/2007 | Tumati et al. |
| 7,866,143 B2 | 1/2011 | Buhmann et al. |
| 2004/0112046 A1 | 6/2004 | Tumati et al. |
| 2004/0228776 A1 | 11/2004 | Ball et al. |
| 2005/0022515 A1 | 2/2005 | Stiermann |
| 2005/0167968 A1* | 8/2005 | Mabuchi et al. ............... 280/781 |
| 2006/0153748 A1* | 7/2006 | Huthwohl et al. ............ 422/172 |
| 2006/0156712 A1 | 7/2006 | Buhmann et al. |
| 2006/0266019 A1 | 11/2006 | Ricart-Ugaz |
| 2006/0266022 A1 | 11/2006 | Woerner et al. |
| 2007/0044457 A1 | 3/2007 | Upadhyay et al. |
| 2007/0175208 A1 | 8/2007 | Bandl-Konrad et al. |
| 2008/0028754 A1 | 2/2008 | Tumati et al. |

OTHER PUBLICATIONS

Office action dated Nov. 30, 2011, issued in corresponding U.S. Appl. No. 12/214,258, filed Jun. 16, 2008.

* cited by examiner

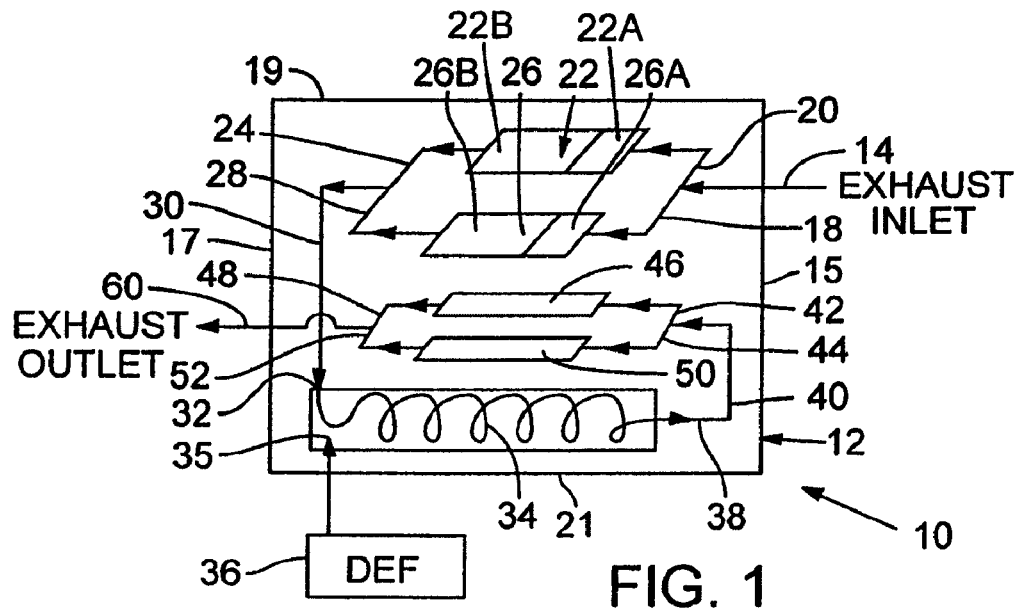
FIG. 1
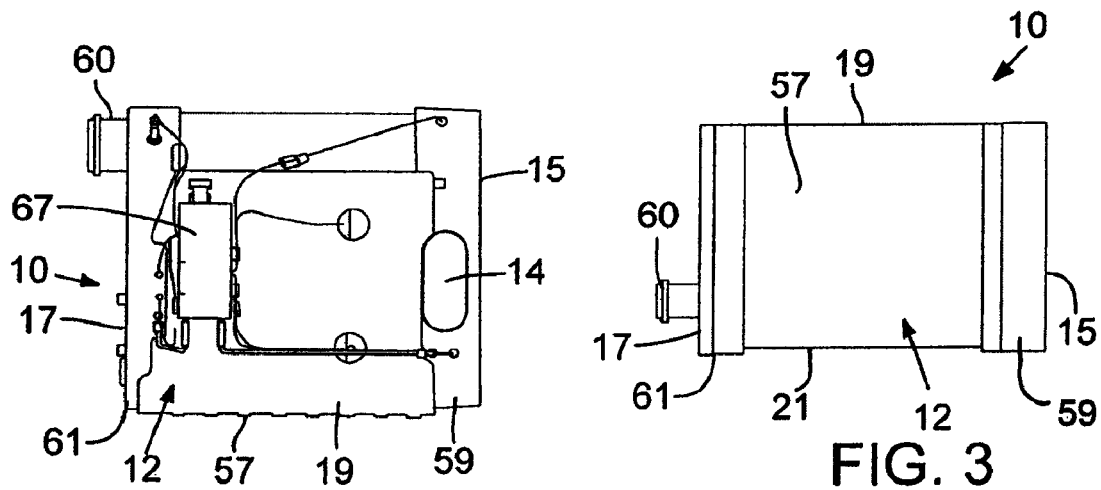
FIG. 2
FIG. 3
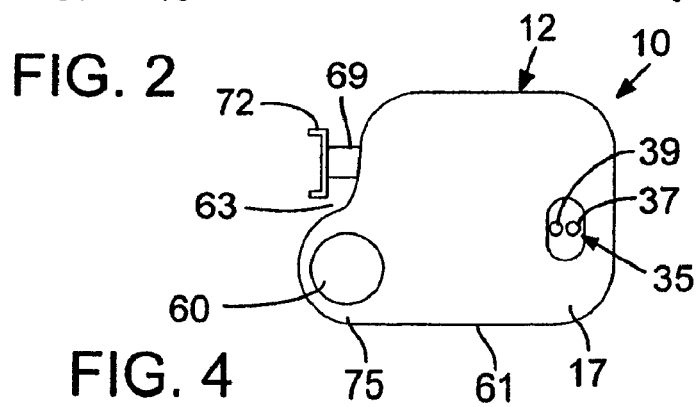
FIG. 4

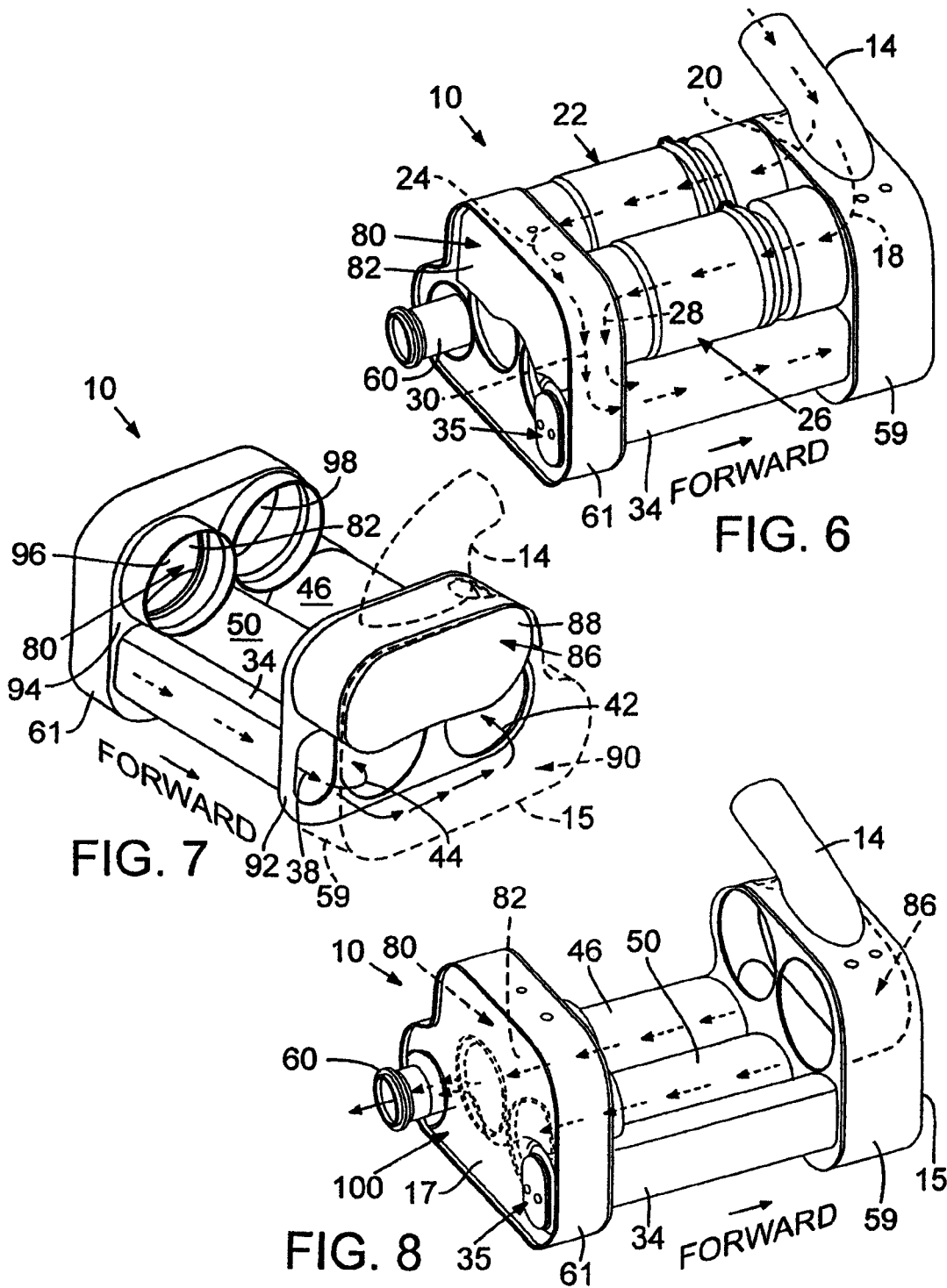

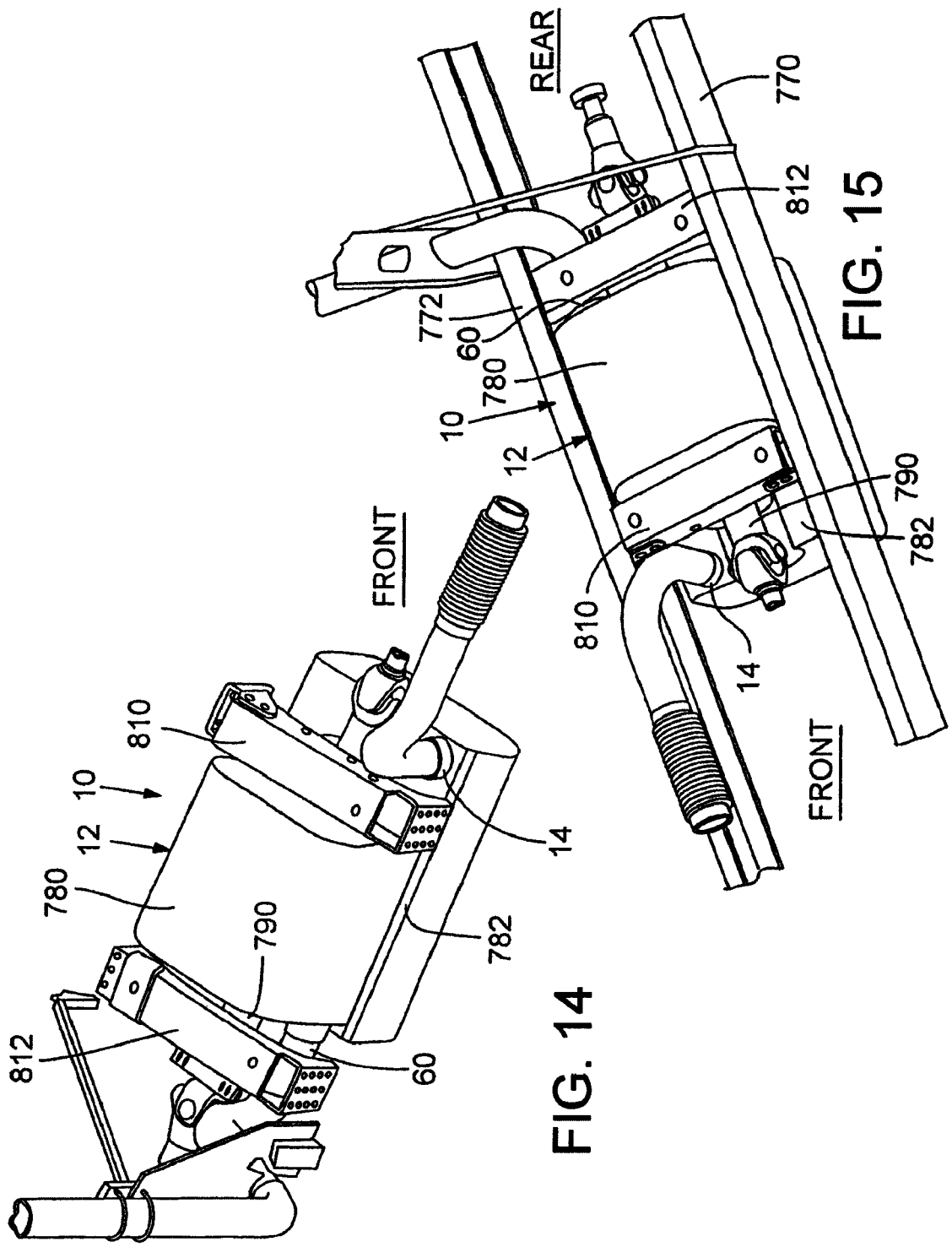

DIESEL ENGINE EXHAUST TREATMENT SYSTEM WITH DRIVE SHAFT ACCOMMODATING HOUSING AND METHOD

CROSS REFERENCE TO RELATED APPLICATION

This application claims the benefit of U.S. Provisional Application 61/057,761 entitled Treatment of Diesel Engine Exhaust and filed on May 30, 2008.

TECHNICAL FIELD

The technology disclosed herein relates to the treatment of diesel engine exhaust and more specifically to the treatment of diesel engine exhaust from land vehicles, such as exhaust from heavy duty diesel engines for trucks.

SUMMARY

In accordance with the technology disclosed herein, diesel engine exhaust aftertreatment systems and methods for treating the exhaust from a diesel engine, such as from heavy duty or medium duty diesel engines, are disclosed. In accordance with one embodiment, an apparatus in accordance with the disclosure can comprise at least one diesel particulate filter (DPF), at least one diesel exhaust fluid mixing chamber to which treatment chemicals such as a urea water mixture is added for the purpose of treating exhaust, and at least one selective catalytic reduction converter (SCR), all contained within a housing that comprises a drive shaft receiving passageway. In a particularly desirable embodiment, an exhaust treatment flow path passes from an exhaust inlet, through dual parallel diesel particulate filters, through a diesel exhaust fluid mixing chamber and through dual parallel SCR converters to an exhaust outlet. The exhaust can be separated into two exhaust streams for delivery to the diesel particulate filters and then be recombined for delivery to the mixing chamber. From an outlet of the mixing chamber, the exhaust can be separated into plural exhaust streams for delivery to respective SCR converters. Following treatment by the SCR converters, the exhaust can be rejoined into a common stream for exiting from an exhaust outlet of the housing.

In accordance with an embodiment, the housing can define a drive shaft passageway with the housing being coupled to both of the frame rails of a vehicle and positioned at a location between the frame rails when mounted to a vehicle with the vehicle drive shaft passing through the drive shaft passageway. In a particular form of this embodiment, the housing can be split with upper and lower housing sections being provided with each housing section defining a portion of the drive shaft passageway.

In accordance with one embodiment, the drive shaft accommodating housing can be coupled or mounted to the frame rails with, for example, the housing being oriented so that the length of the housing extends in the same direction as the length of the frame rails. The housing can have an upper portion positioned between vertical planes along the outer edge surfaces of the frame rails adjacent to the housing. The housing can be mounted to the frame rails, such as using mounting brackets or to cross members coupled to the frame rails. The term "outer" refers to a location farther from the longitudinal center line of the vehicle. In another embodiment, a lower portion of the housing can have projecting portions extending outwardly beneath the frame rails or beyond a plane containing the outer surface of one or both of the frame rails.

In this disclosure, the term "coupled to" or "coupling" means both direct connection between two components as well as indirect connection in two components through one or more other components. Also, in this disclosure the terms "a" or "and" or "at least one" include both the singular and the plural. That is, for example, the reference to "a" diesel particulate filter encompasses an apparatus with one diesel particulate filter as well as an apparatus with more than one diesel particulate filter as in each case a diesel particulate filter is present.

The housing can comprise a plurality of housing portions or sections assembled together to form the housing for the exhaust gas treatment components. In a particularly desirable embodiment, the housing is configured such that exhaust reverses direction as it travels through the housing with a desirable gas flow path including three such reversals of gas flow direction. For example, the exhaust can flow generally in a first direction through one or more diesel particulate filters, reverse direction to flow through a diesel exhaust fluid mixing chamber, and reverse direction again to flow through one or more SCR converters.

In accordance with an embodiment, a housing is disclosed for a diesel engine exhaust treatment apparatus for a land vehicle, the exhaust treatment apparatus comprising at least one particulate filter, a diesel exhaust fluid mixing chamber, and at least one selective catalytic reduction converter, the land vehicle including first and second spaced apart elongated frame rails that extend in a lengthwise direction of the vehicle, the vehicle comprising an elongated drive shaft positioned in the space between vertical planes intersecting the respective frame rails, the housing for coupling to the first and second frame rails and the housing comprising: an exhaust inlet and an exhaust outlet; an exhaust flow path communicating through the housing from the exhaust inlet to the exhaust outlet, at least one particulate filter, a diesel exhaust fluid mixing chamber, and at least one selective catalytic reduction converter being positioned within the housing in the exhaust flow path; and the housing comprising a drive shaft passageway for passage of the drive shaft therethrough.

In accordance with an embodiment, the housing can comprise first and second housing portions that are coupled together to comprise the housing, each of the housing portions defining a portion of the drive shaft passageway. The first and second housing portions can comprise a first upper housing section and a second lower housing section, the first upper housing section can be shorter in length than the second lower housing section.

As another aspect of an embodiment, the exhaust inlet can be included in a lower housing portion and the exhaust outlet can be included in an upper housing portion, the lower housing portion can comprise a first portion of the exhaust flow path and the upper housing portion can comprise a second portion of the exhaust flow path, the at least one particulate filter being positioned in the first portion of the exhaust flow path, and at least one selective catalytic reduction converter can be positioned in the second portion of the exhaust flow path. The first portion of the exhaust flow path can also comprise the diesel exhaust fluid mixing chamber, the lower housing portion being configured such that the diesel exhaust fluid mixing chamber is downstream from the at least one particulate filter such that exhaust flows from the exhaust inlet through the at least one particulate filter, through the diesel exhaust fluid mixing chamber and through the at least one selective catalytic reduction converter to the exhaust outlet.

In an embodiment, the first portion of the exhaust flow path can comprise a first transition portion coupled to an exhaust inlet and first and second sections, the lower portion of the housing being configured such that the first and second sections are in series with one another and have inlets coupled to the exhaust inlet and coupled together by the first transition portion, at least one diesel particulate filter comprising the first section and the diesel exhaust fluid mixing chamber comprising the second section, a second transition portion coupling outlets of the first and second sections together with the first and second sections being configured such that exhaust flows from the exhaust inlet, through the first transition portion and generally in a first lengthwise direction from the first transition portion through the first section, reverses direction in the second transition portion and flows generally in a second lengthwise direction opposite to the first lengthwise direction through the second section, the housing comprising a third transition portion coupling the first portion of the exhaust flow path to the second portion of this exhaust flow path, the first and second portions being configured such that exhaust flowing from the second section of the first portion of the exhaust flow path reverses direction in the third transition portion and flows in a third lengthwise direction opposite to the second direction through the second portion of the exhaust flow path to a fourth transition portion and from the fourth transition portion to the exhaust outlet.

In accordance with an embodiment, at least major portions of the first, second and third lengthwise directions can be parallel to the first and second frame rails when the housing is coupled to the first and second frame rails.

In an embodiment, the first section can comprise first and second particulate filters in parallel and coupled to the exhaust inlet and the second portion can comprise first and second selective catalytic reduction converters in parallel and coupled to the exhaust outlet.

In one embodiment, a housing for an exhaust treatment apparatus of a land vehicle can comprise an exhaust inlet and an exhaust outlet, a drive shaft passageway through the housing, and wherein an exhaust flow path exists within the housing between the exhaust inlet and exhaust outlet. The housing can comprise plural housing portions. Also, each of first and second of the plural housing portions can define a respective portion of the drive shaft passageway. As an aspect of an embodiment, the drive shaft passageway can be generally oval in cross section.

The housing can also comprise frame rail mounting brackets for coupling the housing to first and second frame rails of the land vehicle.

As another embodiment, the housing can comprise first and second housing portions, wherein the first housing portion can be below the second housing portion and longer than the second housing portion. Also, the exhaust inlet can be mounted or coupled to the first housing portion and the exhaust outlet can be mounted or coupled to the second housing portion.

In accordance with one embodiment of a method, the method comprises providing a housing for a land vehicle exhaust treatment apparatus, the housing comprising a drive shaft passageway; and coupling the housing to first and second frame rails of the land vehicle with a drive shaft of the vehicle extending through the drive shaft passageway.

An embodiment of a method can comprise inserting the drive shaft through the drive shaft passageway following the coupling of the housing to the first and second frame rails.

Another embodiment of the method can comprise coupling the housing to the first and second frame rails with the drive shaft passing through the drive shaft passageway, the drive shaft being assembled onto the land vehicle prior to coupling the housing to the first and second frame rails.

Yet another embodiment of the method comprises assembling first and second housing portions to comprise the housing with the drive shaft passageway.

These and other aspects of the disclosure will become more apparent from the following description.

BRIEF DESCRIPTION OF THE DRAWINGS

FIG. 1 is a schematic illustration of an exhaust treatment apparatus in accordance with a first embodiment.

FIG. 2 is a top view of an exemplary housing that can be used to house the components of the embodiment shown in FIG. 1.

FIG. 3 is a side view of the housing of FIG. 2 with exhaust gas sensing and diesel exhaust fluid control components being removed.

FIG. 4 is an end view of the housing of FIG. 3 looking toward an exhaust outlet of the housing.

FIGS. 6-8 illustrate an embodiment of FIG. 5 with various components of the embodiment removed for purposes of illustrating exemplary exhaust flow path through components of this embodiment.

FIG. 10 comprises a sectional view taken along line 10-10 of FIG. 12. FIG. 11 comprises a sectional view taken along line 11-11 of FIG. 12.

FIGS. 14 and 15 are isometric views of an exhaust gas treatment apparatus in accordance with one embodiment of a housing with a drive shaft passageway.

DETAILED DESCRIPTION

Figure 5:
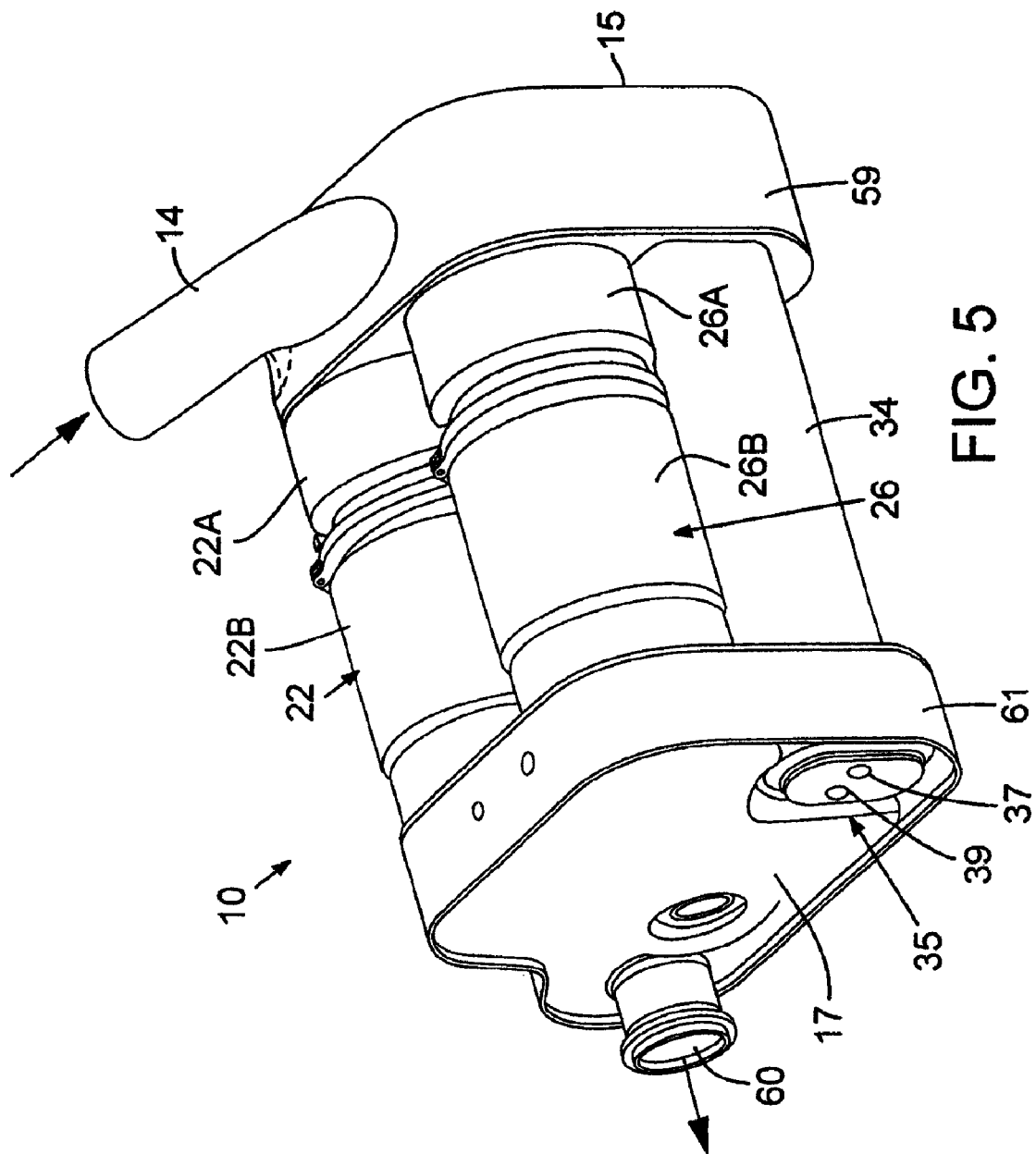
FIG. 5 is a perspective view of the embodiment of FIGS. 2-4 with a portion of the housing removed to show exemplary internal components of the exhaust gas treatment apparatus.

The disclosure proceeds with reference to a number of illustrative embodiments. These embodiments are not to be construed as limiting. The invention includes all novel and non-obvious method acts and features set forth herein, both alone and in combinations and subcombinations with one another.

With reference to FIG. 1, the exemplary embodiment of an exhaust treatment system 10 is illustrated and shown in schematic form. The illustrated system 10 is shown contained within a housing 12 comprising an exhaust inlet 14 and an exhaust outlet 60 with various exhaust processing or treatment components included in the system in an exhaust flow path between the inlet and outlet. As explained below, housing 12 can be comprised of a plurality of components that are assembled into or comprise the housing which, when assembled, desirably comprises an integrated housing for all of the exhaust treatment components included in the system. The housing 12 of FIG. 1 also comprises a drive shaft accommodating passageway, such as the example shown in FIG. 9.

The exhaust gas treatment system 10 is suitable for treating exhaust gas from a diesel engine such as a truck engine. In an exemplary approach, exhaust gas, such as from a truck engine, is delivered via exhaust inlet conduit 14 to the interior of the housing. Within the housing, the exhaust gas stream can be separated into plural gas streams, such as bifurcated into two gas streams that travel along pathways or sections 18, 20 of a first portion of an exhaust gas flow path.

Exhaust gas passing along the pathway 20 enters an inlet to a first diesel particulate filter 22 and exits from an outlet of the filter along a flow path 24. Gas flowing along path 18 enters an inlet of another diesel particulate filter 26 and passes from an outlet of this diesel particulate filter to a flow pathway 28. The gas streams along pathways 24 and 28 in this embodiment rejoin one another to flow along a common pathway 30 to a downstream portion of the exhaust gas treatment system. In the illustrated embodiment, the diesel particulate filters 22, 26 are in parallel with one another. Additional diesel particulate filters can be added to this system, desirably also in parallel with diesel particulate filters 22 and 26, if desired. However, the use of two diesel particulate filters 22 and 26 in parallel with one another has been found suitable for satisfactory removal of diesel particulates from a heavy duty diesel engine exhaust stream.

The term diesel particulate filter has been applied to components 22 and 26 because one of the primary functions of these components is to remove particulates from the exhaust stream. However, this does not preclude the inclusion of other exhaust treatment components therein or connected thereto. For example, in the embodiment of FIG. 1, diesel particulate filter 22 is shown subdivided into respective components 22A and 22B. Section 22A can comprise a diesel oxidation catalyst converter. A specific example of a diesel oxidation catalyst converter is a honeycombed cordierite ceramic material substrate coated with platinum and/or palladium as a catalyst, which can be included in cylinders or other housing subcomponents connected to or forming part of a housing for the diesel particulate filter. Diesel oxidation catalyst converters are commercially available with one specific example being available from Corning Incorporated. An example of one specific form of a diesel particulate filter, which does not preclude the use of alternative other forms of diesel particulate filters, is an aluminum titanate ceramic filter such as is also available from Corning Incorporated. The diesel particulate filter component of the filter 22 is indicated at 22B in FIG. 1. In addition, the filter 26 comprises diesel oxidation catalyst converter and diesel filter components 26A, 26B.

A diesel particulate filter such as 22 and 26 can be quite compact yet extremely efficient at removing particulates from the exhaust gas stream. For example, using diesel oxidation catalyst converters in housings that are ten and one-half inches in diameter and five inches long and diesel particulate filters in housing that are ten and one-half inches in diameter and ten inches long have proven to be about 90% efficient at removing soot (diesel particulates) from the exhaust gas stream of a heavy duty diesel truck engine. Thus, the overall assembled length of such an oxidation catalyst converter and diesel particulate filter is about fifteen inches. Although less desirable, more or fewer diesel particulate filters can be included in an exhaust gas treatment system in accordance with this disclosure. If more diesel particulate filters are included, desirably they are also arranged in parallel with filters 22 and 26.

The exhaust flow path 30 communicates with an inlet 32 of a diesel exhaust fluid mixing chamber 34 wherein the filtered gases entering inlet 32 can be subjected to reduction or hydrolysis by injecting a reducing agent, such as ammonia or a solution of urea and water that forms ammonia within the mixing chamber, into the exhaust gas stream. The diesel exhaust fluid being delivered from a tank or other storage unit 36 to nozzles or other delivery mechanisms at an injection or dispersion location 35 at the upstream end of the mixing chamber 34 in this example. In a conventional manner, supply and return lines communicate between the mixing chamber and the tank 36.

A common diesel exhaust fluid is a urea water mixture that contains about 32.5% urea by volume with the urea being available as an automotive grade urea. The dose of urea that is injected can be controlled depending upon the concentration of nitrous oxide in the exhaust downstream from the diesel particulate filters with sensors being used to sense the nitrous oxide level. The exhaust mixed with the diesel exhaust fluid reaches an outlet 38 of the mixing chamber and flows from outlet 38 along an exhaust flow pathway 40 to one or more selective catalyst reduction converters. Exemplary catalyst reduction converters can comprise a ceramic material coated with chemicals that, together with the diesel exhaust fluid and heat of the exhaust operate to convert nitrous oxide in the exhaust into nitrogen and water vapor, two harmless and natural components of the air we breathe. Exemplary catalyst substrates, such as ceramic materials, can include honeycombed cordierite ceramic such as described above having an iron zeolite coating. The iron zeolite coated substrates, for example, is commercially available from Johnson Matthey Incorporated.

The use of plural diesel particulate filters and plural SCRs increases the frontal (cross-sectional) area through which exhaust gas flows in contrast to a system having a single diesel particulate filter and single SCR of lesser total cross sectional surface area. This reduces back pressure through the exhaust treatment system and thereby contributes to increased fuel efficiency. For example, two diesel particulate filters that are ten and one-half inches in diameter have a total frontal area of about one hundred and seventy three square inches (as does two SCRs of the same diameter). Internal baffles can be used to substantially equalize the flow between the two parallel diesel particulate filters and the two parallel SCRs. Desirably, the flow can be equalized to be from about 49 percent to about 51 percent of the exhaust flowing through each of the components, when two diesel particulate filters and two SCRs are used (one in each of the parallel flow paths). For example, a flow reducing baffle can be included at the inlet or outlet of a diesel particulate filter that would otherwise have a higher exhaust flow to redirect the flow toward the other diesel particulate filter. The approach can also be used for an SCR that otherwise would have a higher exhaust flow. By equalizing the flow using internal flow direction baffles, the back pressure from the treatment system is reduced.

Back pressure is also reduced by having no more than three exhaust gas flow reversals in one desirable embodiment of a treatment system.

In a conventional manner, matting can be included inside tubing or other housings for the individual diesel particulate filters and SCRs that surround the substrates contained thereon. This matting assists in containing heat within these components to increase the temperature therein to increase their effectiveness. A housing wall for the system, such as wall 57 described below, such as of steel, can act as a heat shield and can also assist in maintaining a higher temperature within the system, while keeping exterior temperature within a desired maximum level (e.g., less than or equal to 230° Celsius). Temperatures within exhaust treatment components (diesel particulate filters, diesel exhaust fluid mixing chambers and SCRs) is also increased in by embodiments where these components are positioned immediately adjacent to one another (e.g., stacked with parallel SCRs, mixing chambers and particulate filters) in a common housing. As a result of the higher temperatures, conversion of NOx by the SCRs to nitrogen and water is more effective. The higher NOx conversion allows the engine to operate with greater thermal efficiency. Also, the higher NOx conversion in conjunction with the higher exhaust temperatures allows passive regeneration (burning of soot) in the diesel particulate filters to be more effective. This reduces the frequency of active regeneration (injecting and burning diesel fuel in the diesel particulate filters) to burn soot therein and thereby adds to the fuel efficiency of vehicles using the treatment system in comparison to systems where more frequent active filter regeneration is employed.

In addition, the inclusion of a hydrolysis chamber or pipe integrated into a common housing with the other components makes the system easily applicable to a variety of vehicle types. This also reduces the need for individualized design and independent emissions testing of systems with separated components.

The dosage of urea and frequency of active filter regeneration can be tuned to a particular engine to achieve the desired emission level for the engine.

In the embodiment shown in FIG. 1, exhaust passing along flow path 40 is separated into a plurality of exhaust flow paths, such as bifurcated into two separate flow paths 42, 44. The gas flowing along pathway 42 reaches an inlet to a selective catalytic reduction converter 46 (hereinafter sometimes called SCR or SCR converter) and passes from SCR 46 to an outlet thereof and to a flow path 48. The gas flowing along flow path 44 enters an inlet to a second SCR 50 and exits from an outlet of SCR 50 to a flow path 52. Flow paths 48 and 52 in this example rejoin one another within the housing and exit from the housing at the exhaust outlet 60. Thus, in this example, the SCRs 46, 50 are in parallel with one another. One or more additional SCRs can be added, also desirably in parallel, if desired. However, a tandem set of SCRs has proven sufficient to reduce nitrous oxide to desired levels. As a specific example, the SCRs 46, 50 can each comprise two SCRs in series with one another. As a specific example, each of the SCR components of an overall SCR (46 or 50) can be contained in a ten and one-half inch diameter cylindrical housing that is seven inches long. As a result, the exemplary SCR 46 is fourteen inches long by ten and one-half inches diameter, as is exemplary SCR 50. With this construction, as well as the construction of the diesel particulate filters 22, 26, as described below, a compact housing can include these components and the diesel fluid mixing chamber.

In the embodiment of FIG. 1, the housing 12 is shown with a first end portion comprising an end wall 15 and a second end comprising an end wall 17, a top wall 19 and a bottom wall 21. For purposes of convenience in describing this embodiment, the length of the housing can be deemed to extend between the housing ends 15, 17. Thus, a first portion of the exhaust flow path, including the diesel particulate filters extends in a lengthwise direction from a location adjacent end wall 15 to a location adjacent to a location adjacent to end wall 17 and outlet 38 being adjacent to end wall 15 Also, the SCR's 46, 50 are located in respective first and second sections of a lengthwise extending third portion of the exhaust flow path with the inlets to the SCRs being adjacent to end wall 15 and the outlets of the SCRs being adjacent to end wall 17. Thus, this exemplary embodiment comprises a three pass exhaust gas treatment system with components in a common housing.

That is, exhaust flows generally in a first lengthwise direction within the housing in a first portion of an exhaust flow path, reverses direction and flows generally lengthwise through the housing in a second direction opposite to the first direction, and again reverses direction to flow generally lengthwise through the housing in a third direction opposite to the second direction between the respective exhaust inlets and exhaust outlets. It should be noted that the terms exhaust inlet and exhaust outlet are not limited to a single inlet or a single outlet. In addition, in this embodiment, a first portion of the exhaust flow path is bifurcated with two flow paths each containing a respective parallel diesel particulate filters and the third portion of the exhaust flow path is also bifurcated and contains respective parallel SCRs. In this description, the term "generally" with reference to the direction of a flow path does not preclude exhaust traveling in a variety of directions but instead refers to the overall direction of flow of at least the majority of exhaust gas in a direction from an inlet to a portion of the flow path to an outlet to a portion of the flow path.

With reference to FIGS. 2-4, an exemplary housing 12 is shown. In FIG. 2, an exemplary exhaust sensor and controller 67 is shown for sensing the level of nitrous oxide and other components in the exhaust gas stream at various locations in the exhaust treatment apparatus. Controller 67 can control flow valves to adjust the levels of diesel exhaust fluid delivered to the mixing chamber. Any suitable controller can be used if desired.

The exemplary housing 12 comprises a central portion enclosed by a central lengthwise extending wall 57 that encloses this portion of the housing. The diesel particulate filter 22, 26, mixing chamber 34 and SCRs 46, 50 are positioned within the central portion of the housing in this exemplary embodiment. Housing end portions 59, 61 in the illustrated embodiment enclose transition portions or zones that direct exhaust from one exhaust flow portion to a downstream exhaust flow portion. End portions 59, 61 comprise transition portions which can be operable to cause the gas exhaust flow to change directions in the plural path system of this embodiment.

With reference to FIG. 4, the illustrated housing 12 comprises a lengthwise extending protrusion or projection 75 along an inner and lower portion of the housing. When the illustrated exhaust treatment is installed, one or more brackets or 69, or other mounting mechanisms, couple the housing 12 to a longitudinally extending frame rail 72 of the land vehicle with at least a portion of the frame rail being positioned in a notch or void area of housing 63 above the protrusion 75. In addition in this example the lower projecting portion 75 of the housing extends underneath at least a portion of the frame rail 72 and, as can be understood from the description below, desirably contains at least a portion of one of the exhaust treatment components, such as an SCR. Thus, the illustrated housing 12 is provided with an upper frame rail receiving void and lower projections along one side of the housing. In FIG. 4, a diesel fluid injection location 35 is shown where diesel exhaust fluid (e.g., urea) inlet and outlet lines 37, 39 terminate at the exterior of the housing in one specific example of a housing construction. Other housing components shown in FIGS. 2-4 that are in common with components indicated schematically in FIG. 1 have been assigned the same numbers for convenience in explanation. The housing of FIGS. 2-4 can also define all or a portion of a drive shaft passageway.

FIGS. 5-8 further illustrate an exemplary embodiment of an exhaust gas treatment apparatus 10. Again, components in common in these figures with components of FIGS. 1-4 have been assigned the same numbers and will not be discussed in detail. With reference to FIG. 5, the illustrated mixing chamber 34 has generally an oval cross-section and (as best stated in FIG. 8) is oriented in a side by side relationship to the SCRs 46, 50 in this example.

With reference to FIG. 6, exhaust entering inlet 14 is shown flowing along flow path branches 18, 20 through the respective diesel particulate filters 22, 26. The exhaust from inlet 14 passes through a transition portion, such as a chamber 86 of end portion 59 (FIG. 8) that acts as a header to distribute the exhaust to the diesel particulate filter inlets. As can be seen in FIG. 7, the first transition portion comprises an internal chamber 86 within end portion 59 of the housing, with a wall 88 of this chamber being shown in FIG. 7. Chamber 86 communicates with inlet 14 and with the respective inlets to the diesel particulate filters. Exhaust entering chamber 86 is contained within this chamber and delivered to the respective inlets to the diesel particulate filters. Thus, a common chamber collects the entering exhaust and delivers it simultaneously to both of the diesel particulate filters in embodiments where two diesel particulate filters are used. Separate conduits leading to respective inlets of the diesel particulate filters can also be used as a less desirable alternative. The exhaust exiting from the diesel particulate filters flows into another transition chamber or zone 80 at the outlets of the particulate filters. The illustrated transition chamber 80 is within the end portion 61 of the housing. An end wall 82 of chamber 80 is shown in both FIGS. 6 and 8. Chamber 80 directs the exhaust flow from diesel particulate filters 22, 26 to flow path 30 and into the inlet of the mixing chamber 34. A common chamber 80 operable as a header for collecting and combining the exhaust gas from both diesel particulate filters is a desirable embodiment for combining the filtered exhaust gas into a single stream for delivery to a mixing chamber. However, separate conduits connected to the respective particulate filter outlets and to one or more inlets to the mixing chamber can be used.

As best seen in FIG. 7, exhaust from the mixing chamber 34 enters a transition portion, such as chamber 90, that communicates with the inlets to the respective SCRs 46, 50. A common chamber 90 directs the exhaust from the mixing chamber to reverse direction and flow through the respective SCRs. Again, separate conduits can be used for this purpose although this is less desirable than a common chamber 90. End wall 15 of the housing comprises the end wall of the chamber 90. An interior wall 92 bounds the interior of chamber 90 as well as the interior of chamber 86 with openings being provided through wall 92 relating to the respective SCRs, mixing chamber and diesel particulate filters. An interior wall 94 is provided with openings 96, 98 therethrough communicating with the outlet of the diesel particulate filters. In FIG. 7, the wall 82 bounding the chamber 80 can also be seen. Chamber 90 thus, in this example, comprises one example of a third transition zone or portion for redirecting the direction of flow of exhaust gas entering the chamber 90 from the mixing chamber 34. Exhaust gas exiting the SCRs enter a chamber 100 with the entering exhaust gas being directed through chamber 100 to the outlet 60. Wall 94 has openings therethrough for passage of the outlets from the SCRs to the chamber 100. Again, separate conduits can be utilized to direct the exhaust flow from the SCRs to the outlets, although this would be less desirable. The chamber 100 thus comprises an example of a fourth transition portion operable to direct exhaust entering the chamber 86 is separated by chamber 86 from exhaust entering chamber 90 from the mixing chamber 34. In addition, exhaust from the diesel particulate filters entering chamber 80 is separated by this chamber from exhaust entering chamber 100 from the SCRs.

Figure 9:
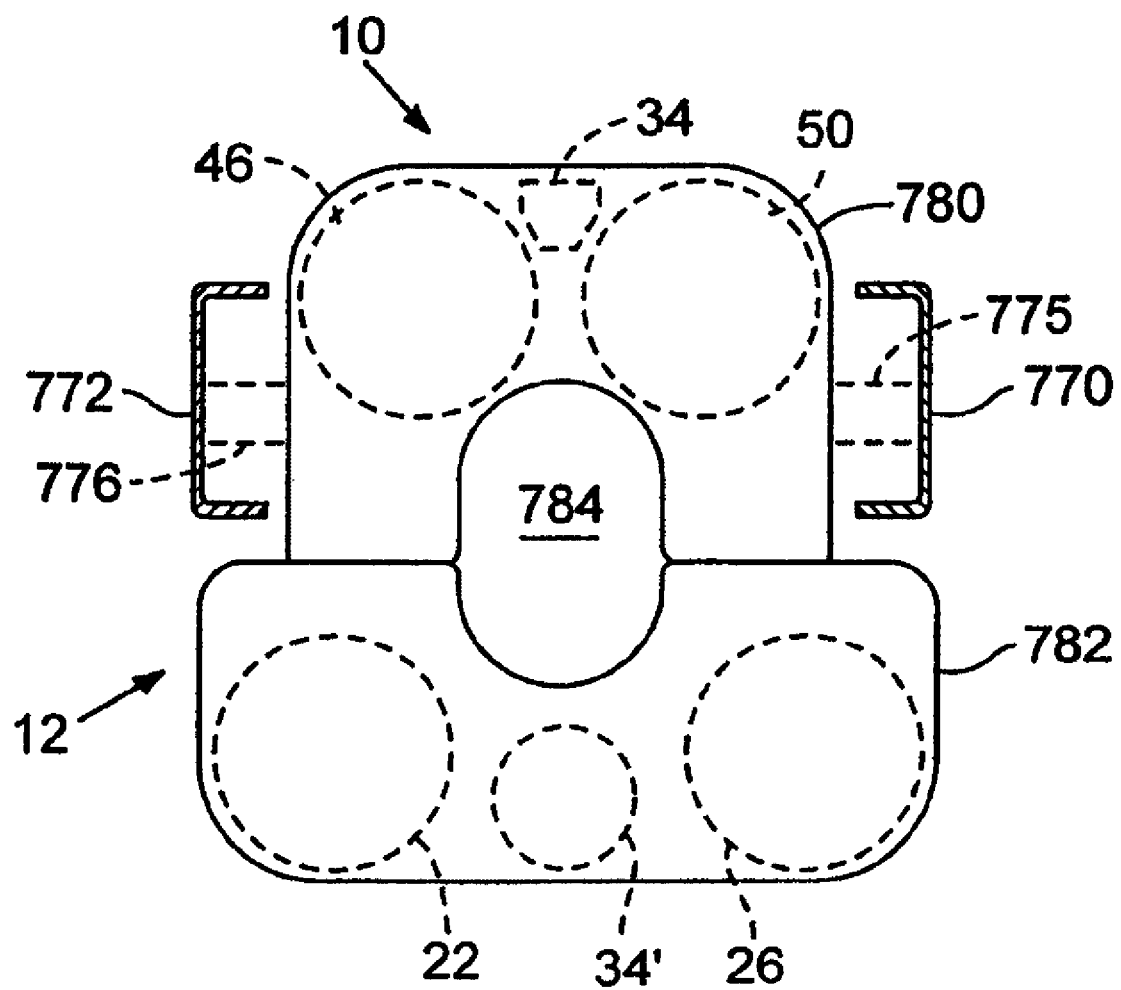
FIG. 9 illustrates an exemplary embodiment comprising a housing, which can include plural housing sections, which defines a lengthwise extending passageway therethrough to accommodate the drive shaft of a vehicle when the housing is coupled to respective frame rails of the vehicle with a portion of the housing being positioned between the frame rails.

It should be noted that alternative locations for the diesel particulate filters, mixing chamber and SCR converters can be used in addition to the desirable locations shown in FIG. 9. For example, the SCR converters can be stacked on either side of the drive shaft passageway with the diesel particulate filters stacked at the opposite side. Also, diesel particulate filters can be positioned above the SCR converters. The mixing chamber location can also be moved. The transition chambers or zones would be adjusted with changes in the location of the various components to redirect exhaust between upstream and downstream components as described previously.

FIGS. 9-21 illustrate an embodiment of a diesel exhaust treatment system comprising at least one diesel exhaust filter, and more desirably two such filters, a diesel exhaust fluid mixing chamber, and at least one SCR, and more desirably two SCRs. These various components can be arranged in a manner described above in connection with FIGS. 2-8 embodiment, although in the embodiment shown in FIG. 9, the mixing chamber 34 is desirably positioned at an upper portion of the housing as opposed to a lower portion indicated at 34' in FIG. 9. Components in common with the embodiments previously discussed have been assigned the same number and will not be discussed in detail.

In the embodiments of FIGS. 9-21, the housing includes a drive shaft passageway extending through the housing to accommodate the drive shaft of a vehicle passing through the drive shaft passageway when the housing is coupled to the frame rails (indicated at 770 and 772 in FIG. 9) of the vehicle. The passageway can partially or entirely surround a drive shaft. FIG. 9 illustrates a passageway that is intended to entirely surround a drive shaft. A passageway that partially surrounds a drive shaft can, for example, be open at the bottom, a less desirable configuration. The housing 12 can be designed for coupling to the frame rails at a location that positions at least a portion of the housing between the frame rails. Brackets, such as 775 and 776 can be used to connect the housing to the respective frame rails. Alternatively, as discussed below, other attachment approaches can be used. For example, cross members can be provided at respective ends of the housing and coupled thereto with cross member ends being mounted or coupled to the respective frame rails and with the cross members extending therebetween. In FIG. 9, an exemplary drive shaft passageway 784 is shown. In addition, housing 12 in this example comprises upper and lower housing sections 780, 782 with each of the housing sections defining a portion of the illustrated drive shaft passageway, in this example.

Figure 10:
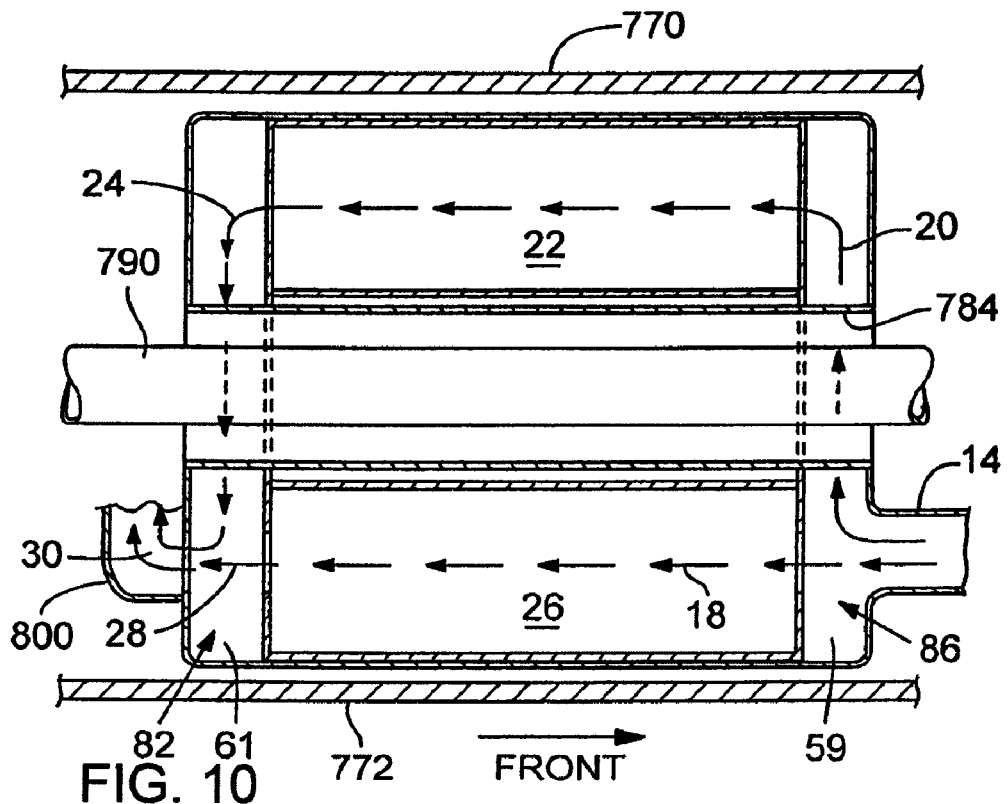
FIGS. 10 and 11 illustrate exemplary exhaust flow paths through the embodiment of FIG. 9.
Figure 11:
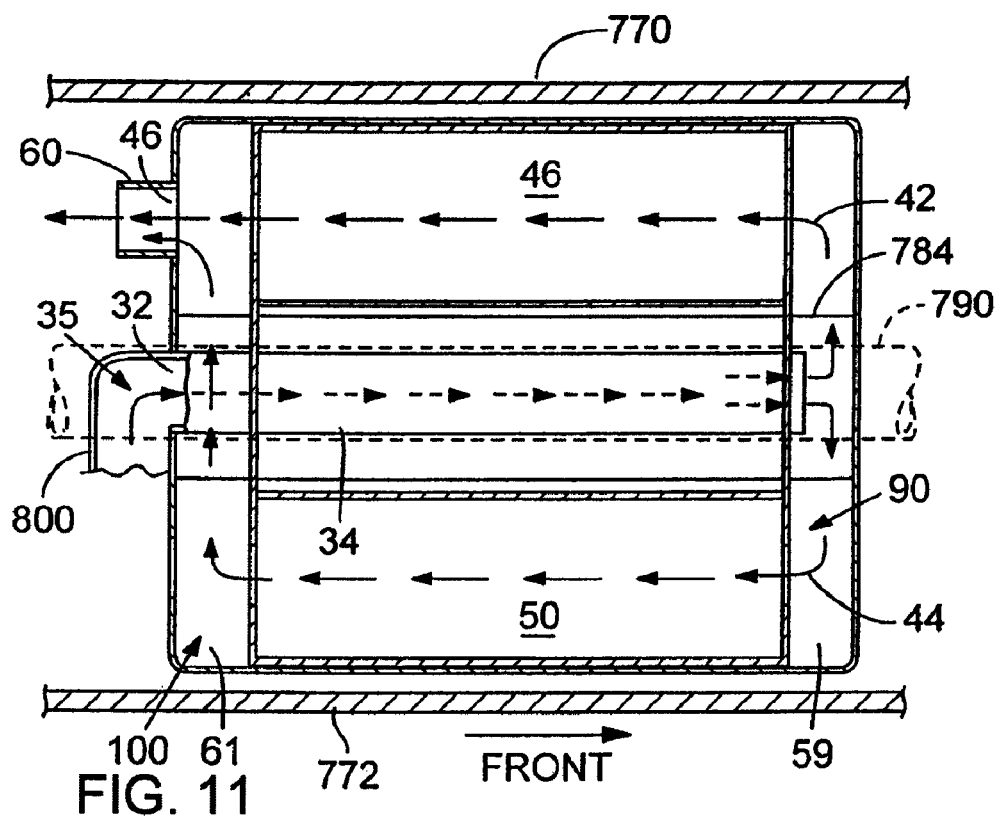
Figure 12:
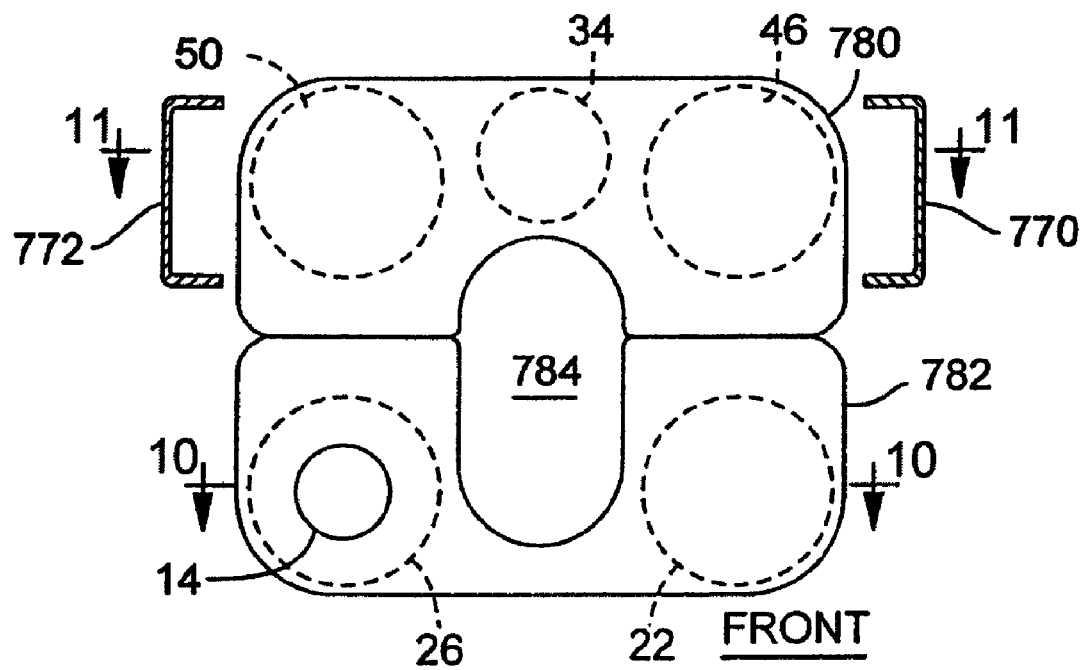
FIGS. 12 and 13 are respective front and rear end views of an embodiment similar to the embodiment in accordance with FIG. 9.
Figure 13:
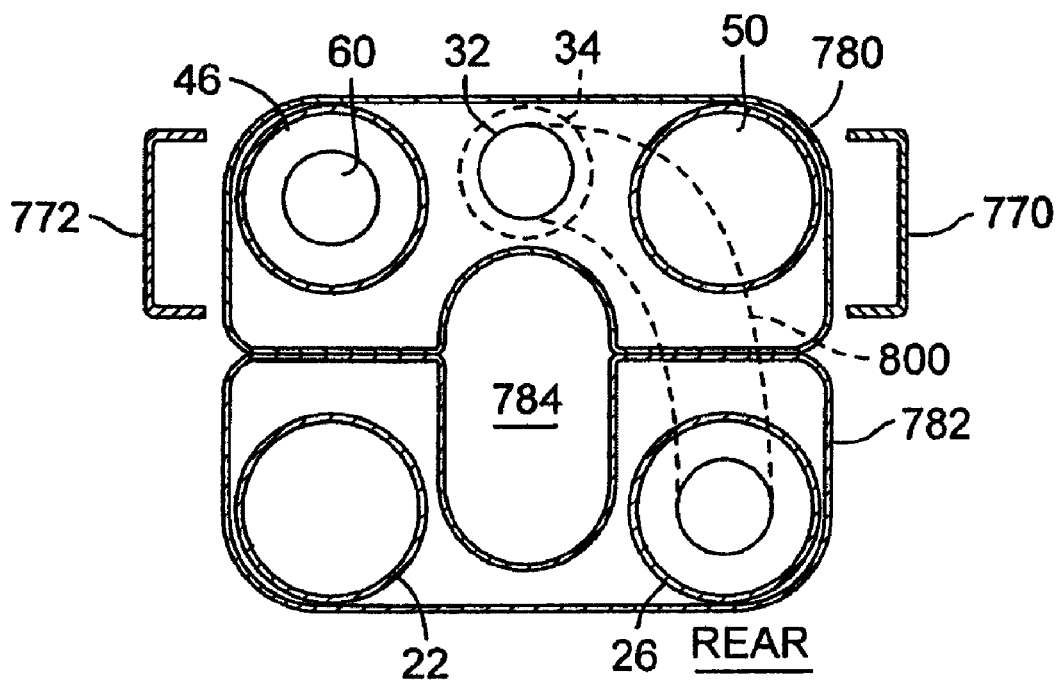

FIGS. 10 and 11 schematically illustrate the embodiment of FIG. 9 and include the drive shaft passageway 784 shown therein. FIG. 10 schematically shows a lower portion of the apparatus with parallel diesel particulate filters 22, 26 shown in this lower portion together with a flow path from the exhaust inlet 14 into the respective diesel particulate filters. The transition portion 86 (FIG. 10) at the diesel particulate filter inlets, transition portion 82 at the diesel particulate filter outlets, in this example coupled by a conduit 800 to an inlet 32 (FIG. 11) to the mixing chamber 34, the transition portion 90 (FIG. 11) coupling the outlet of the mixing chamber to the respective SCRs 46, 50, and the transition portion 100 coupling the outlets of the SCRs to the exhaust outlet 60 are all shown in these figures. FIGS. 12 and 13 illustrate end views of the embodiments of FIGS. 10 and 11 with internal components therein shown in dashed lines. In the embodiments of FIGS. 10-13, the upper and lower housing sections 780, 782 are of the same length.

Figure 16:
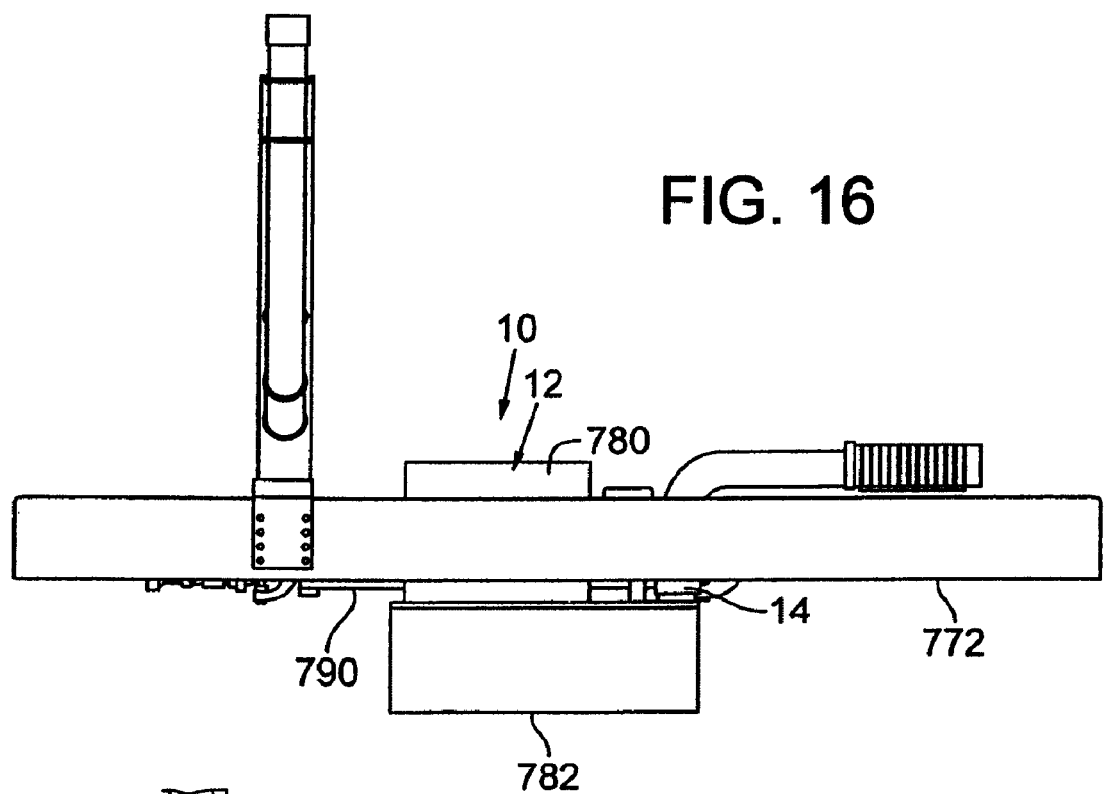
FIG. 16 is a side elevational view of the embodiment of FIGS. 14 and 15.
Figure 17:
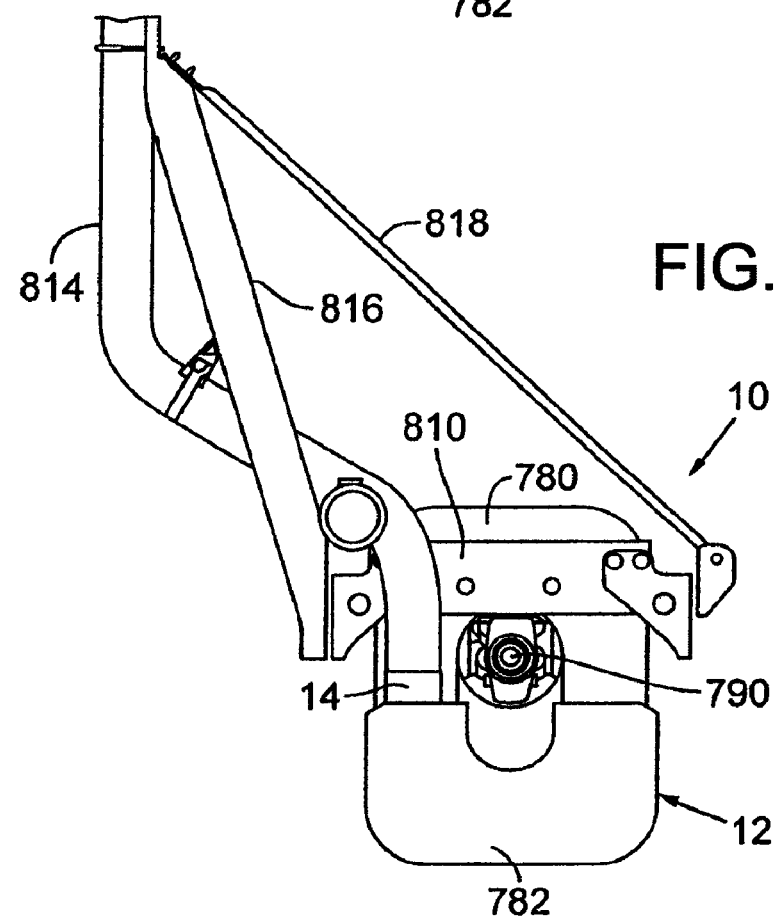
FIG. 17 is a front view of the embodiment of FIGS. 14 and 15.

FIGS. 14 and 15 further illustrate these embodiments of this form of exhaust treatment system with some modifications. In the embodiments of FIGS. 14 and 15, respective front and rear cross-members 810, 812 extending between the frame rails are shown. Mounting brackets at the ends of these cross-members secure the cross-members to the respective frame rails 770, 772. The housing sections can be coupled to these cross members. In the embodiments of FIGS. 14 and 15, the upper portion of the housing 780 is shorter than the lower portion of housing 782 to accommodate other components on the vehicle. For example, by shortening the upper housing section, a battery box or other vehicle component can be placed in the area above the lower housing section where no upper housing section is present. FIG. 16 is a side elevational view of the embodiment of FIG. 14 to further illustrate this embodiment. Desirably the upper and lower housing sections 780, 782 are interconnected, such as by clamps or other fasteners. However, these housing sections can be separately mounted, such as to the frame rails without any interconnection being provided between the housing sections, although this is less desirable. FIG. 17 illustrates an end view of the embodiment of FIG. 16 again to further illustrate an exemplary construction. In addition, exemplary mounting braces are shown for an exhaust stack 814, the braces being indicated at 816, 818 in FIG. 17.

Figure 18:
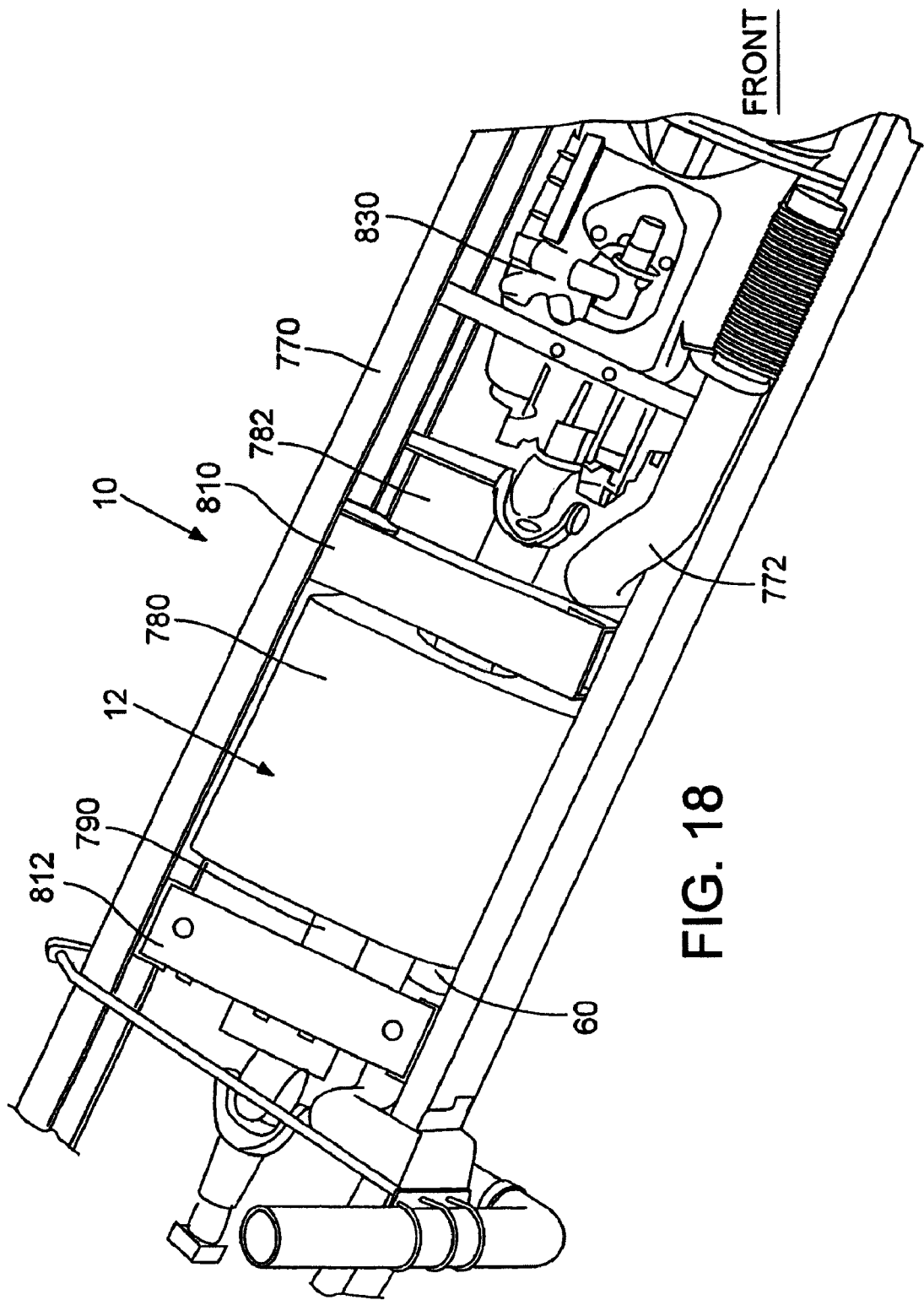
FIG. 18 is an isometric view of the embodiment of FIG. 14 with additional vehicle components shown therein.

FIG. 18 is similar to FIG. 15, but also illustrates a transmission 830 of the vehicle.

Figure 19:
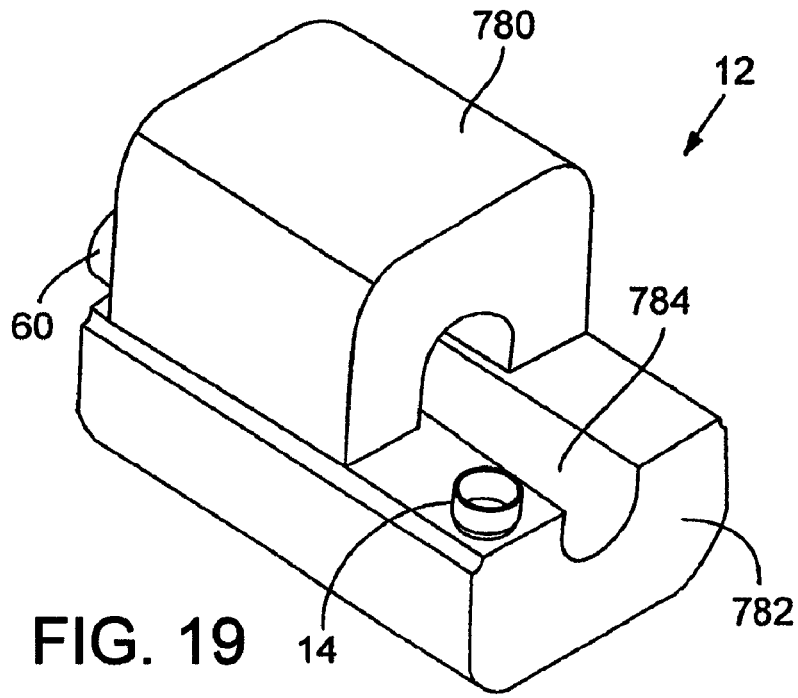
FIGS. 19 and 20 are respective isometric views of an exemplary housing that can be used in the embodiments of FIGS. 14 and 15 looking respectively from the respective first and second end portions of the housing.
Figure 20:
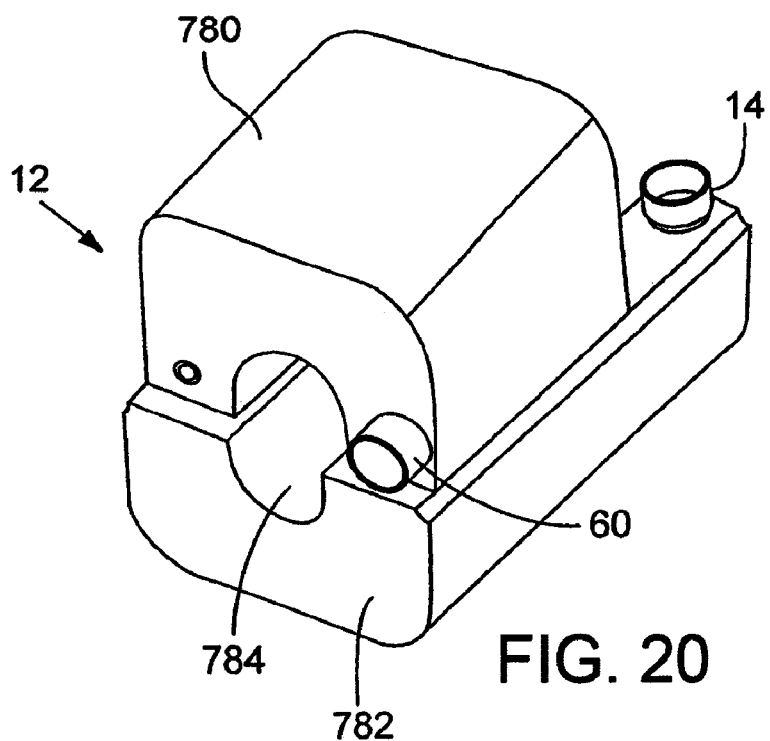

FIGS. 19 and 20 provide additional views of the exemplary housing 12 comprising upper and lower housing portions with the drive shaft accommodating passage 784 being shown in these figures.

Figure 21:
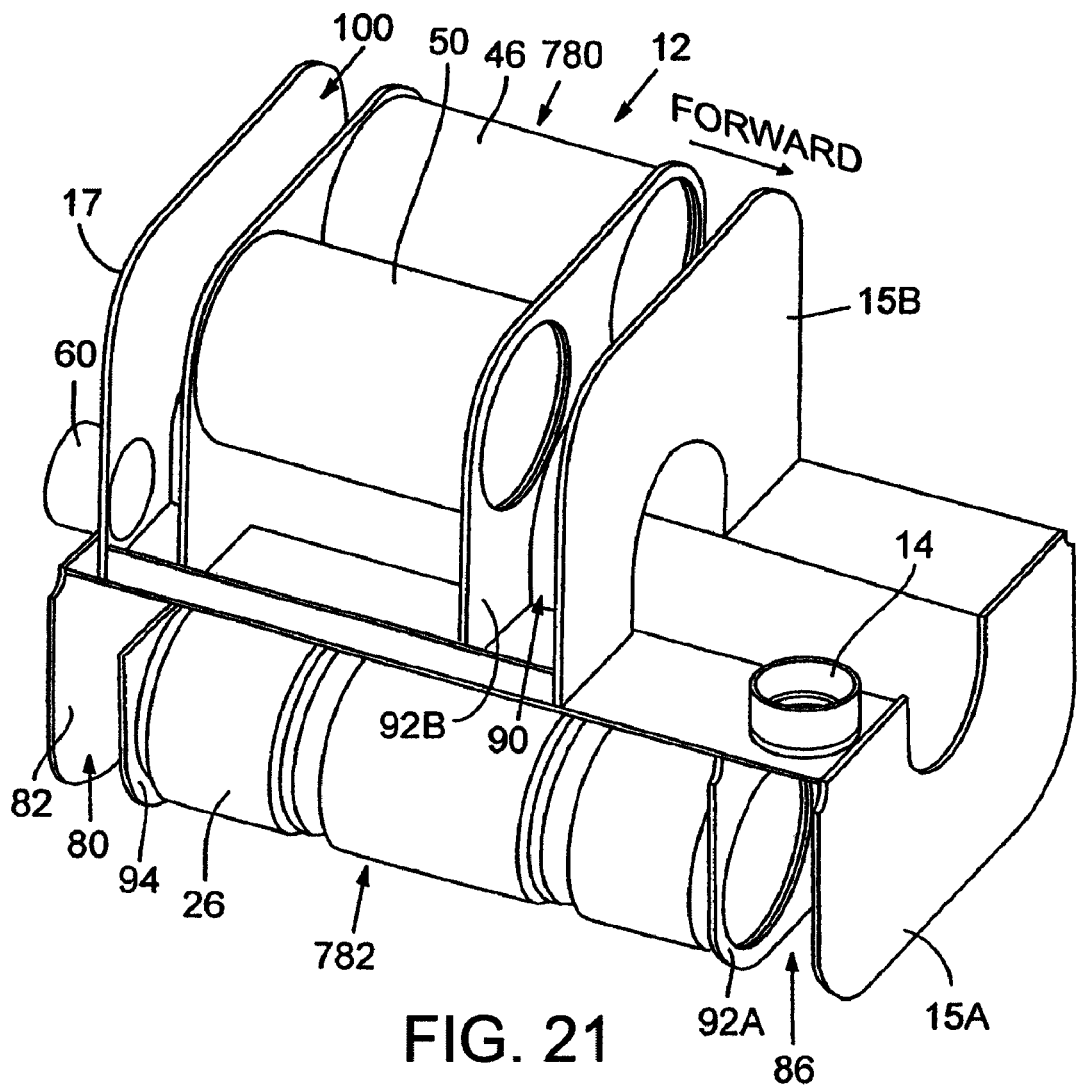
FIG. 21 is a partially broken away view of the housing of FIGS. 19 and 20 illustrating an exemplary arrangement of exhaust treatment components therein.

FIG. 21 illustrates an embodiment corresponding to FIG. 20 with the outer wall or shell of the housing portions 780, 782 removed. In this figure, end wall 15 is shown as wall sections 15A and 15B at the respective ends of the lower and upper housing portions with these wall sections being offset from one another. In addition, wall 92 in FIGS. 2-8 is shown as two separate offset wall sections 92A and 92B in FIG. 21. In FIG. 21, the various internal chambers and transition portions are shown (transition portion 86 at the inlet to the diesel particulate filters, 80 at the outlet of the diesel particulate filters, 90 at the inlet to the SCRs and 100 at the outlet from the SCRs to the exhaust 60).

Having illustrated and described the principles of my invention with reference to a number of embodiments, it should be apparent to those of ordinary skill in the art that these embodiments may be modified in arrangement and detail without departing from the inventing principles disclosed herein. I claim as my invention all such modifications as fall within the scope of the following claims.

I claim:

1. A housing for a diesel engine exhaust treatment apparatus for a land vehicle, the exhaust treatment apparatus comprising at least one particulate filter, a diesel exhaust fluid mixing chamber, and at least one selective catalytic reduction converter, the land vehicle including first and second spaced apart elongated frame rails that extend in a lengthwise direction of the vehicle, the vehicle comprising an elongated drive shaft positioned in the space between vertical planes intersecting the respective frame rails, the housing for coupling to the first and second frame rails and comprising:

a housing comprising first and second end portions and an exhaust inlet and an exhaust outlet;

an exhaust flow path communicating through the housing from the exhaust inlet to the exhaust outlet, the at least one particulate filter, the diesel exhaust fluid mixing chamber, and at least one selective catalytic reduction converter positioned within the housing in the exhaust flow path; and the housing comprising a drive shaft passageway for passage of the drive shaft therethrough, the drive shaft passageway entering the first end portion of the housing and exiting the second end portion of the housing and having length extending between the first and second end portions of the housing, wherein the housing entirely surrounds at least a portion of length of the drive shaft passageway.

2. A housing according to claim 1 wherein the housing comprises first and second housing portions with respective first and second ends that are coupled together to comprise the housing, each of the housing portions defining a portion of the drive shaft passageway, the first and second housing portions defining a drive shaft passageway that is closed by the first and second housing portions except at ends of the housing portions.

3. A housing according to claim 2 wherein the first and second housing portions comprise a first upper housing portion and a second lower housing portion, the first end of the first upper housing portion being spaced inwardly from the first end of the second lower housing portion such that the first upper housing portion is shorter in length than the second lower housing portion.

4. A housing according to claim 3 wherein the exhaust inlet is included in the lower housing portion and the exhaust outlet is included in the upper housing portion, the lower housing portion comprising a first portion of the exhaust flow path and the upper housing portion comprising a second portion of the exhaust flow path, the at least one particulate filter being positioned entirely in the lower housing portion and in the first portion of the exhaust flow path and the at least one selective catalytic reduction converter being positioned in the second portion of the exhaust flow path.

5. A housing according to claim 4 wherein the first portion of the exhaust flow path also comprises the diesel exhaust fluid mixing chamber, the lower housing portion being configured such that the diesel exhaust fluid mixing chamber is positioned entirely in the lower housing portion and downstream from the at least one particulate filter such that exhaust flows from the exhaust inlet through the at least one particulate filter, through the diesel exhaust fluid mixing chamber and through the at least one selective catalytic reduction converter to the exhaust outlet, and wherein the diesel exhaust fluid mixing chamber is below the drive shaft passageway.

6. A housing according to claim 1 wherein the housing comprises upper and lower housing portions with respective first and second end walls, the first end wall of the upper housing portion being positioned inwardly from the first end wall of the second lower housing portion such that the first upper housing portion is shorter than the lower housing portion.

7. A housing according to claim 1 wherein the housing comprises an upper housing portion comprising first and second upper housing side portions at least a portion of the first and second upper housing side portions positioned between the frame rails when the housing is coupled to the frame rails, the housing also comprising a lower housing portion positioned below the upper housing portion when the housing is mounted to the frame rails, the drive shaft passageway comprising a portion that is above the elevation of the bottom of the frame rails when the housing is coupled to the frame rails and a portion that is below the elevation of the bottom of the frame rails when the housing is coupled to the frame rails.

8. A housing according to claim 7 wherein the at least one particulate filter comprises first and second diesel particulate filters in parallel and positioned in the upper housing portion and coupled to the exhaust inlet and wherein the at least one selective catalytic reduction converter comprises first and second selective catalytic reduction converters in parallel and positioned in the lower housing portion and coupled to the exhaust outlet.

9. A housing for a diesel engine exhaust treatment apparatus for a land vehicle, the exhaust treatment apparatus comprising at least one particulate filter, a diesel exhaust fluid mixing chamber, and at least one selective catalytic reduction converter, the land vehicle including first and second spaced apart elongated frame rails that extend in a lengthwise direction of the vehicle, the vehicle comprising an elongated drive shaft positioned in the space between vertical planes intersecting the respective frame rails, the housing for coupling to the first and second frame rails and comprising:
  an exhaust flow path communicating through the housing from the exhaust inlet to the exhaust outlet, the at least one particulate filter, the diesel exhaust fluid mixing chamber, and at least one selective catalytic reduction converter positioned within the housing in the exhaust flow path;
  the housing comprising a drive shaft passageway for passage of the drive shaft therethrough;
  wherein the housing comprises upper and lower housing portions that are coupled together to comprise the housing, each of the housing portions defining a portion of the drive shaft passageway;
  wherein the exhaust inlet is included in the lower housing portion and the exhaust outlet is included in the upper housing portion, the lower housing portion comprising a first portion of the exhaust flow path and the upper housing portion comprising a second portion of the exhaust flow path, the at least one particulate filter positioned in the first portion of the exhaust flow path and the at least one selective catalytic reduction converter positioned in the second portion of the exhaust flow path;
  wherein the first portion of the exhaust flow path also comprises the diesel exhaust fluid mixing chamber, the lower housing portion being configured such that the diesel exhaust fluid mixing chamber is downstream from the at least one particulate filter such that exhaust flows from the exhaust inlet through the at least one particulate filter, through the diesel exhaust fluid mixing chamber and through the at least one selective catalytic reduction converter to the exhaust outlet; and
  wherein the first portion of the exhaust flow path comprises a first transition portion coupled to the exhaust inlet and first and second sections, the lower portion of the housing being configured such that the first and second sections are in series with one another and are coupled to the inlet and together by the first transition portion, the at least one diesel particulate filter comprising the first section and the diesel exhaust fluid mixing chamber comprising the second section, a second transition portion coupling the first and second sections together with the first and second sections being configured such that exhaust flows from the exhaust inlet, through the first transition portion and generally in a first lengthwise direction from the first transition region through the first section, reverses direction in the second transition portion and flows generally in a second lengthwise direction opposite to the first lengthwise direction through the second section from the second transition portion, the apparatus comprising a third transition portion coupling the first portion of the exhaust flow path to the second portion of the exhaust flow path, the first and second portions being configured such that exhaust flowing from the second section of the first portion of the exhaust flow path reverses direction in the third transition portion and flows in a third lengthwise direction opposite to the second direction through the second portion of the exhaust flow path, the apparatus comprising a fourth transition portion coupling the second portion of the exhaust flow path to the exhaust outlet.

10. A housing according to claim 9 wherein at least major portions of the first, second and third lengthwise directions are parallel to the first and second frame rails when the housing is coupled to the first and second frame rails.

11. A housing according to claim 9 wherein the at least one particulate filter comprises first and second diesel particulate filters in parallel and coupled through the first transition portion to the exhaust inlet and wherein the at least one selective catalytic reduction converter comprises first and second selective catalytic reduction converters in parallel and coupled through the fourth transition portion to the exhaust outlet.

12. A housing for an exhaust treatment apparatus of a land vehicle that comprises first and second spaced apart frame rails to which the housing is mounted, the housing comprising an exhaust inlet and an exhaust outlet, a drive shaft passageway having a length and extending through the housing, and wherein an exhaust flow path exists within the housing between the exhaust inlet and exhaust outlet, the drive shaft passageway comprising a portion that is above the elevation of the bottom of the frame rails when the housing is mounted to the frame rails and a portion that is below the elevation of the bottom of the frame rails when the housing is mounted to the frame rails, wherein at least a portion of the length of the drive shaft passageway is entirely surrounded by the housing.

13. A housing according to claim 12 wherein the housing comprises plural housing portions.

14. A housing according to claim 12 wherein the housing comprises first and second housing portions that each define a respective portion of the drive shaft passageway.

15. A housing according to claim 14 wherein the first housing portion is below the second housing portion and longer than the second housing portion, wherein the exhaust inlet is mounted to the first housing portion and the exhaust outlet is coupled to the second housing portion.

16. A housing according to claim 12 in combination with exhaust treatment components comprising at least one diesel particulate filter in the exhaust flow path, at least one diesel exhaust fluid mixing chamber in the exhaust flow path downstream from the at least one diesel particulate filter, and at least one selective catalytic reduction (SCR) converter in the exhaust flow path downstream from the at least one diesel particulate filter.

17. A method comprising:
  providing a housing for a land vehicle exhaust treatment apparatus, the housing comprising a drive shaft passageway extending through the housing between opposed end portions of the housing;
  coupling the housing to first and second frame rails of the land vehicle having a drive shaft such that the drive shaft of the land vehicle extends through the drive shaft passageway and with at least a portion of the housing being positioned at an elevation below the elevation of the bottom of the drive shaft and at least a portion of the housing being positioned at an elevation above the elevation of the top of the drive shaft; and wherein the act of coupling the housing to the first and second frame rails comprises coupling first and second housing portions to the first and second frame rails and entirely surrounding at least a portion of the length of the drive shaft by the first and second housing portions.

18. A method comprising:

providing a housing for a land vehicle exhaust treatment apparatus, the housing comprising a drive shaft passageway extending through the housing between opposed end portions of the housing;

coupling the housing to first and second frame rails of the land vehicle prior to assembling a drive shaft onto the land vehicle, with at least a portion of the housing being positioned at an elevation below the elevation of the bottom of the drive shaft when the drive shaft is assembled to the vehicle and at least a portion of the housing being positioned at an elevation above the elevation of the top of the drive shaft when the drive shaft is assembled to the vehicle; and inserting the drive shaft through the drive shaft passageway to assemble the drive shaft to the vehicle following the coupling of the housing to the first and second frame rails, wherein the act of coupling the housing to the first and second frame rails comprises coupling first and second housing portions to the first and second frame rails and entirely surrounding at least a portion of the length of the drive shaft by the first and second housing portions when the drive shaft is assembled to the vehicle.

* * * * *